United States Patent
Yang

(10) Patent No.: US 8,130,299 B2
(45) Date of Patent: Mar. 6, 2012

(54) METHOD OF PERFORMING INTERLACED PREVIEW FOR A CMOS SENSOR

(75) Inventor: Wen-Chu Yang, Hsin-Chu Hsien (TW)

(73) Assignee: PixArt Imaging Inc., Science-Based Industrial Park, Hsin-Chu (TW)

( * ) Notice: Subject to any disclaimer, the term of this patent is extended or adjusted under 35 U.S.C. 154(b) by 444 days.

(21) Appl. No.: 12/401,581

(22) Filed: Mar. 10, 2009

(65) Prior Publication Data

US 2010/0231737 A1 Sep. 16, 2010

(51) Int. Cl.
*H04N 3/14* (2006.01)
*H04N 5/335* (2006.01)

(52) U.S. Cl. .................................. 348/305; 348/222.1

(58) Field of Classification Search .................. 348/302, 348/320, 305, 322, 222.1
See application file for complete search history.

(56) References Cited

U.S. PATENT DOCUMENTS

| 5,671,298 A * | 9/1997 | Markandey et al. ........... 382/298 |
| 7,697,049 B1 * | 4/2010 | Lavi .............................. 348/305 |
| 2004/0008281 A1 * | 1/2004 | Jeffrey et al. ................. 348/607 |
| 2006/0077294 A1 * | 4/2006 | Nagata ........................... 348/458 |

* cited by examiner

*Primary Examiner* — Nelson D. Hernández Hernández
(74) *Attorney, Agent, or Firm* — Winston Hsu; Scott Margo

(57) ABSTRACT

Combo lines having one odd line and one even line are utilized for generating an interlaced preview from an image sensor. Odd combo lines are read out to generate an odd field. Even combo lines are read out to generate an even field. Interpolation is performed on a plurality of odd field lines generated from the plurality of odd combo lines to generate a plurality of odd interpolated lines. Interpolation is performed on a plurality of even field lines generated from the plurality of even combo lines to generate a plurality of even interpolated lines. The interlace preview is generated from the plurality of odd interpolated lines and the plurality of even interpolated lines.

10 Claims, 6 Drawing Sheets

METHOD OF PERFORMING INTERLACED PREVIEW FOR A CMOS SENSOR

BACKGROUND OF THE INVENTION

1. Field of the Invention

The present invention relates to CMOS sensors, and more particularly, to a method of performing interlaced preview for a CMOS sensor.

2. Description of the Prior Art

Video images are typically divided into pixels, each pixel containing information about color and brightness of the video image at the pixel's location. The video image is also called a frame, and a typical video is recorded at 24 frames per second (24 fps) or higher. As each frame in the video is displayed on a screen, such as a liquid crystal display (LCD) or a cathode ray tube (CRT), corresponding pixels of the screen are controlled to display the color and the brightness corresponding to each pixel of the video image. With each passing frame, the color and brightness of each pixel are likely to change. Thus, the screen must modify each pixel for each successive frame in the video. Typically, the screen will modify the pixels one at a time, from left to right and top to bottom, in a process call scanning.

If the screen utilizes progressive scan technology, the screen will modify each line in ordered sequence from the top of the screen to the bottom of the screen. However, to save bandwidth, many screens utilize interlaced scan technology, meaning the screen first modifies odd rows of the screen from top to bottom, then even rows of the screen from top to bottom, effectively cutting in half the number of pixels to be received, processed, and modified in each pass. The odd rows are typically called an "odd field," and the even rows are typically called an "even field."

In modern applications, CMOS sensors of recording devices can be used to generate interlaced video signals for use with interlaced screens. Please refer to FIG. 1, which is a diagram illustrating a method of generating an interlaced video frame in a CMOS sensor according to the prior art. The CMOS sensor typically includes a sensor array 100, which has a plurality of sensor lines S1-S480, each comprising red (R) and green (G) subpixels, or green (G) and blue (B) subpixels, in alternating sequence, which may be utilized to interpolate pixels with RGB color information. The RGB subpixels may be controlled by a color filter, which allows light corresponding to the color of each subpixel to strike the subpixel. Each row of pixels in the interlaced video frame is generated from two or more rows of the sensor array 100 that, when combined, include R, G, and B information. To generate an odd field of the interlaced video frame, a first frame 102 at time T(n) may be read out, and odd lines of the frame (L1, L3, L5, and so on) may be interpolated as shown. To generate an even field of the interlaced video frame, a second frame 104 at time T(n+1) may be read out, and even lines of the frame (L2, L4, L6, and so on) may be interpolated as shown. Please note that each pixel of the first frame 102 and the second frame 104 is generated from surrounding pixels to form rows of RGB pixels that are utilized for the interpolation operations mentioned above. In the method shown in FIG. 1, each frame captured by the sensor array 100 can only provide one field to the display device. Thus, the sensor array 100 must be very fast. For example, if the display device runs at 30 fps, the sensor array 100 must capture 60 frames per second. In other words, the sensory array 100 can only be exposed for a maximum of $1/60^{th}$ of a second. Further, because the odd field and the even field are captured at different times, if the scene being captured has objects in rapid motion, the interlaced video frame may exhibit jagged edges.

Please refer to FIG. 2, which is a diagram illustrating a second method of generating an interlaced video frame in a CMOS sensor according to the prior art. In the second method, a sensor array 200 is used to detect rows of subpixels S1-S480 (similar to FIG. 1). The rows of subpixels S1-S480 are then read out into a frame buffer 202. Finally, an odd field 203 and an even field 204 are generated from rows in the frame buffer 202. The odd field 203 includes a plurality of odd lines O1-O240, and the even field 204 includes a plurality of even lines E1-E240. While the sensor array 200 can operate at a lower speed than the sensor array 100, and the even and odd fields 203, 204 are generated from a single frame, which eliminates the jagged edge effect, the method shown in FIG. 2 requires the frame buffer 202, which represents added hardware and complexity.

Please refer to FIG. 3, which is a diagram illustrating a third method of generating an interlaced video frame in a CMOS sensor according to the prior art. In the third method, an RGB paired sensor array 300 is utilized. The RBG paired sensor array 300 is different from the sensor array 100 and the sensor array 200 in that RG rows and GB rows of the RGB paired sensor array 300 are repeated, or doubled, so that when an odd field 301 and an even field 302 are read out, every pair of two lines comprises red, green, and blue color information. Thus, interpolation can be performed on the odd field 301 and the even field 302 to obtain pixels of the frame. However, the RGB paired sensor array 300 requires a non-traditional color filter to generate the special subpixel pattern shown in FIG. 3, making manufacture and design of the CMOS sensor less practical.

SUMMARY OF THE INVENTION

According to an embodiment of the present invention, a method of generating an interlaced preview from an image sensor comprises reading out a plurality of odd combo lines to generate an odd field, each odd combo line comprising an odd line and an even line, reading out a plurality of even combo lines to generate an even field, each even combo line comprising an odd line and an even line, performing interpolation on a plurality of odd field lines of the plurality of odd combo lines to generate a plurality of odd interpolated lines, performing interpolation on a plurality of even field lines of the plurality of even combo lines to generate a plurality of even interpolated lines, and generating the interlace preview from the plurality of odd interpolated lines and the plurality of even interpolated lines.

According to the embodiment of the present invention, a method of generating an interpolated line from an image sensor comprises reading out a first sensor line of the image sensor to generate a first field line, reading out a second sensor line three sensor lines away from the first sensor line to generate a second field line, and generating the interpolated line by interpolating between the first field line and the second field line.

These and other objectives of the present invention will no doubt become obvious to those of ordinary skill in the art after reading the following detailed description of the preferred embodiment that is illustrated in the various figures and drawings.

DETAILED DESCRIPTION

Figure 1:
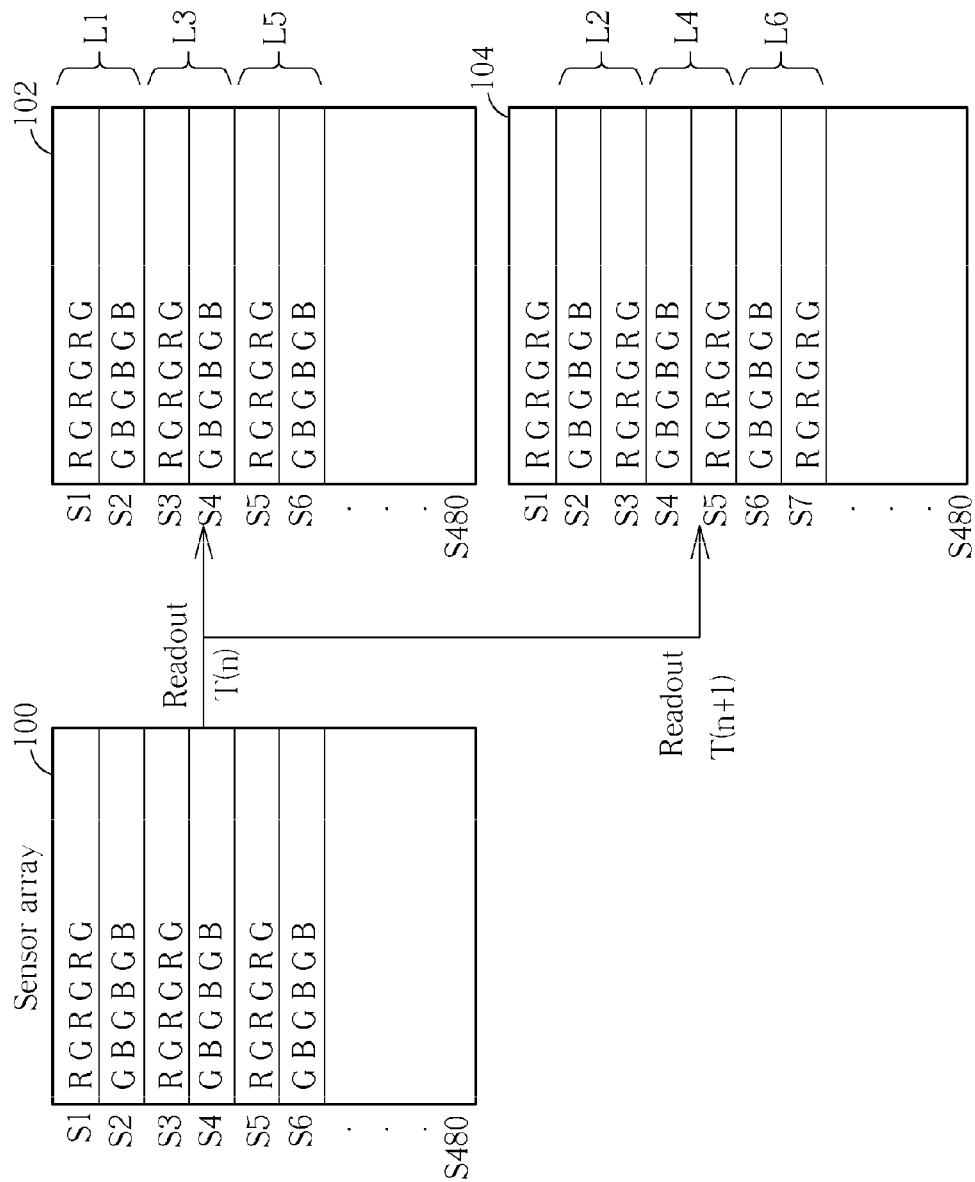
FIG. 1 is a diagram illustrating a method of generating an interlaced video frame in a CMOS sensor according to the prior art.
Figure 2:
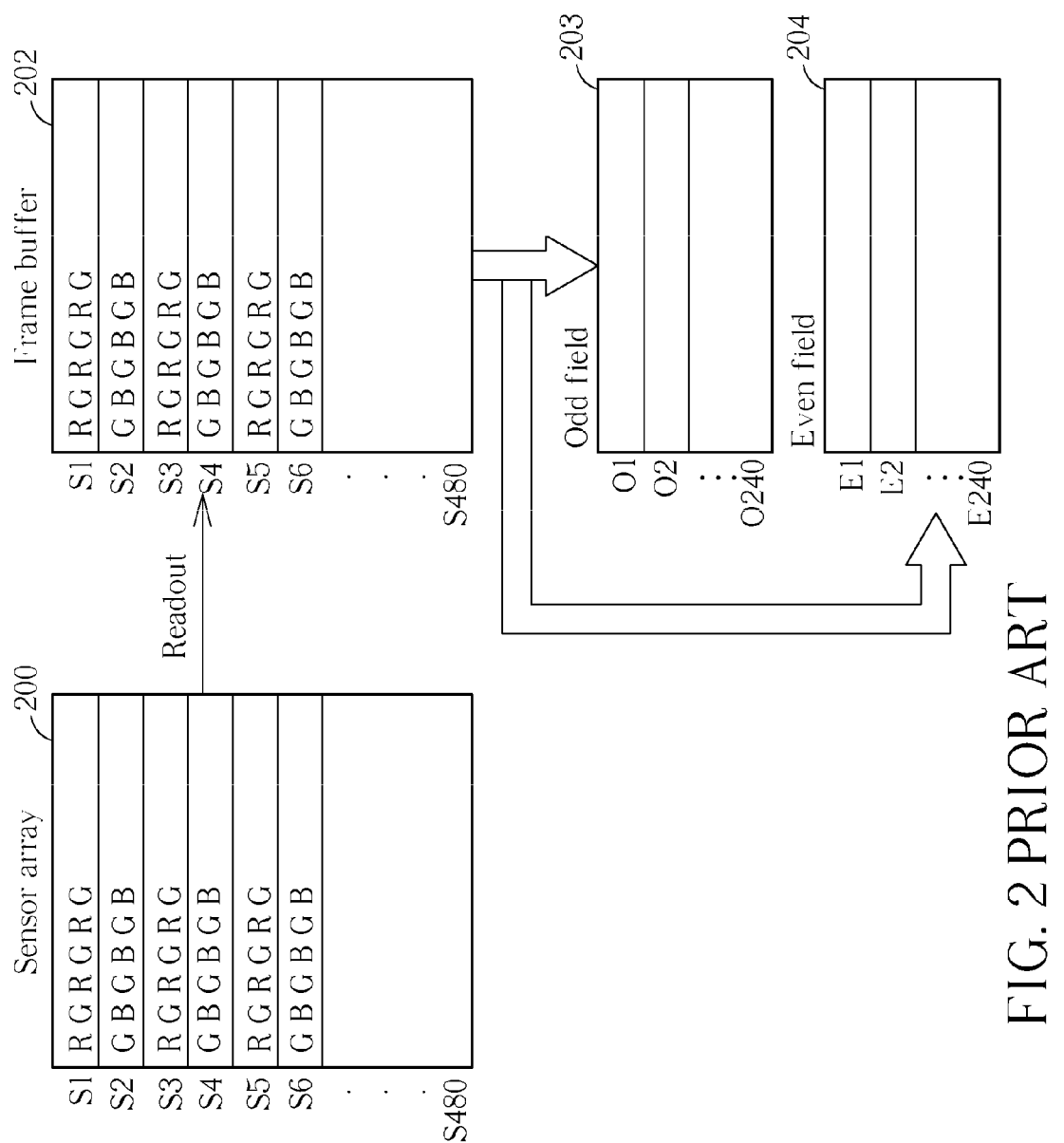
FIG. 2 is a diagram illustrating a second method of generating an interlaced video frame in a CMOS sensor according to the prior art.
Figure 3:
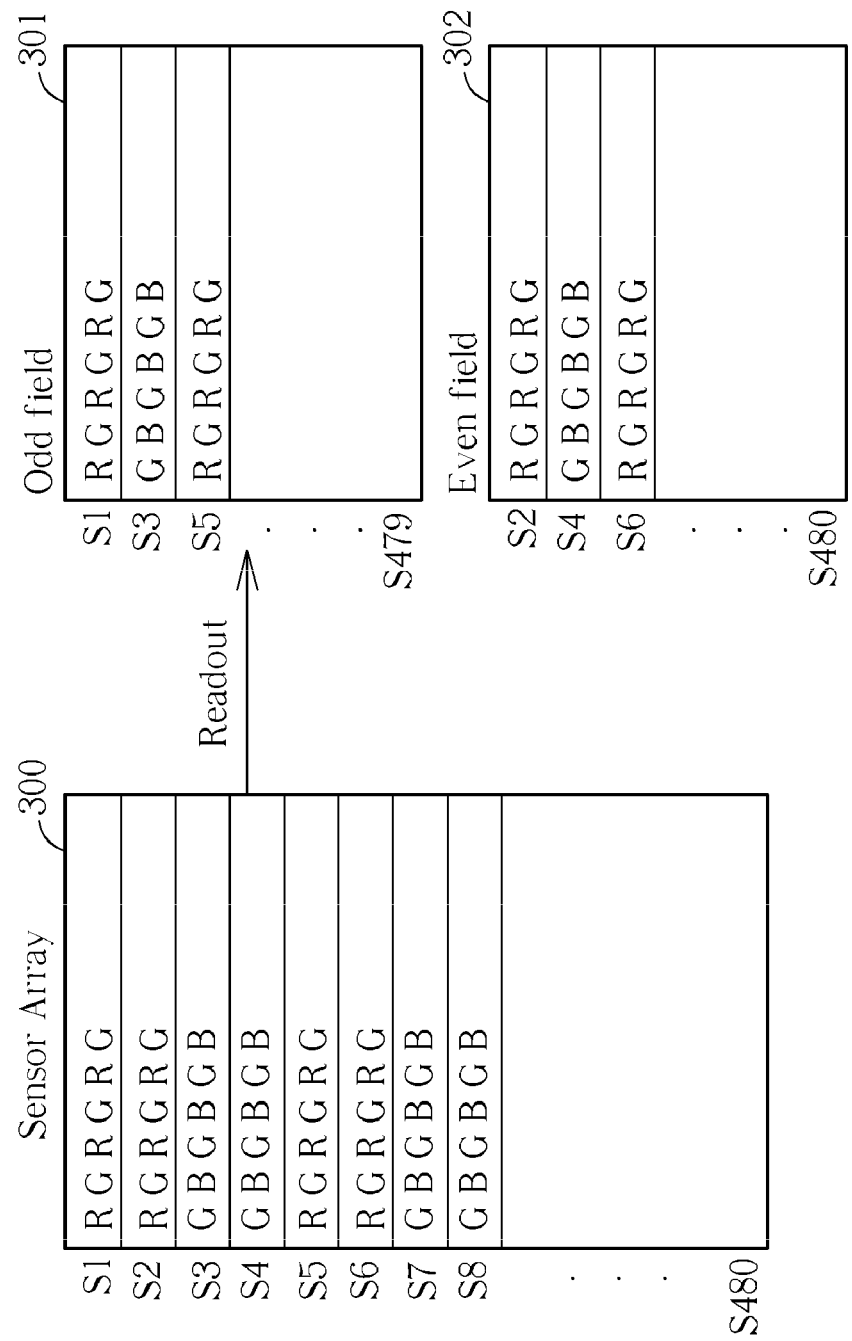
FIG. 3 is a diagram illustrating a third method of generating an interlaced video frame in a CMOS sensor according to the prior art.
Figure 4:
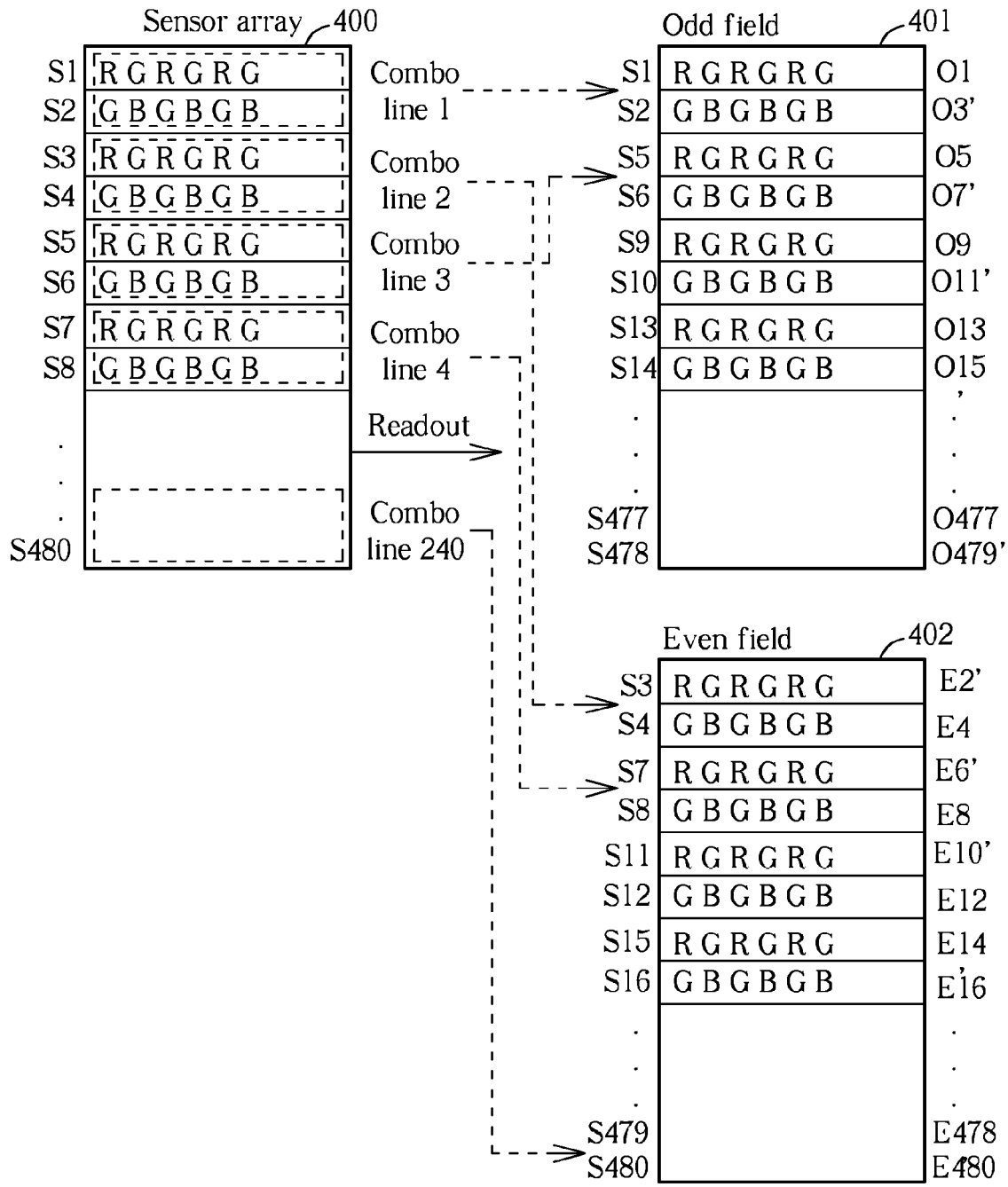
FIG. 4 is a diagram illustrating a method of generating an interlaced video frame in a CMOS sensor according to an embodiment of the present invention.

Please refer to FIG. 4, which is a diagram illustrating a method of generating an interlaced video frame in a CMOS sensor according to an embodiment of the present invention. Utilizing a traditional color filter, a sensor array 400 may be exposed for capturing an image. The sensor array 400 comprises a plurality of sensor lines S1, S2, S3, ... S480, which may be further divided into a plurality of odd lines S1, S3, S5, ... S479, and a plurality of even lines S2, S4, S6, ... S480. If all of the odd lines of the sensor array 400 were extracted, no blue color information would be available for interpolation of odd line pixels of the image. Likewise, if all of the even lines of the sensor array 400 were extracted, no red information would be available for interpolation of even line pixels of the image.

Thus, in the embodiment shown in FIG. 4, the sensor array 400 may be divided into a plurality of combo lines (Combo line 1 to Combo line 240). Each combo line may comprise an odd line and an even line of the plurality of sensor lines of the sensor array 400. Then, a plurality of odd combo lines (Combo lines 1, 3, 5, and so on) of the plurality of combo lines may be read out to generate an odd field 401, and a plurality of even combo lines (Combo lines 2, 4, 6, and so on) of the plurality of combo lines may be read out to generate an even field 402. In this way, each combo line may comprise red, green, and blue color information. Further, each pair of adjacent odd field lines, e.g. lines S1 and S2, S2 and S5, etc., may comprise red, green, and blue color information. And, each pair of adjacent even field lines, e.g. lines S3 and S4, S4 and S7, etc., may comprise red, green, and blue color information. Thus, each pixel of the odd field 401 and each pixel of the even field 402 may be generated from neighboring subpixels to form odd field lines and even field lines, pixels of which have RGB color information. Interpolation may then be performed on the plurality of odd field lines to generate a plurality of odd interpolated lines, e.g. lines O1, O3', O5 ... O477, O479', and interpolation may be performed on the plurality of even field lines to generate a plurality of even interpolated lines, e.g. lines E2', E4, E6' ... E478', E480. Then, the interlace preview may be generated from the plurality of odd interpolated lines and the plurality of even interpolated lines. In the above, the plurality of odd interpolated lines and the plurality of even interpolated lines may each comprise a first part and a second part. Taking the plurality of odd interpolated lines as an example, the first part may comprise each odd field line having an odd field sequence number the same as its original sequence number. Thus, the lines O1, O5, ..., O477 may all be assigned to the first part of the plurality of odd interpolated lines. The second part may comprise a plurality of weighted combinations of the odd field lines whose odd field sequence numbers are close to the odd interpolated sequence numbers. The lines O3', O7', ..., O479' may all be assigned to the second part of the plurality of odd interpolated lines. Thus, the first part and the second part of the plurality of odd interpolated lines may be generated by the assignment steps described above. While the above example describes generation of the first part and the second part of the plurality of odd interpolated lines, the steps may be applied just as easily to generation of the first part and the second part of the plurality of even interpolated lines.

Expressed another way, the odd field 401 starts with a plurality of 4n+1 sensor lines, and a plurality of 4n+2 sensor lines, where n=0, 1, 2 ... N/4, and N represents total sensor lines, e.g. 480 sensor lines as shown in FIG. 4. Similarly, the even field 402 starts with a plurality of 4n+3 sensor lines, and a plurality of 4n+4 sensor lines. Then, each odd combo line may comprise one 4n+1 sensor line and one 4n+2 sensor line. And, each even combo line may comprise one 4n+3 sensor line and one 4n+4 sensor line. The odd field lines may include RGB pixels generated from neighboring subpixels of the 4n+1 and 4n+2 sensor lines, and the even field lines may include RGB pixels generated from neighboring subpixels of the 4n+3 and 4n+4 sensor lines. Each odd interpolated line may then be generated by performing interpolation on two or more odd field lines of the odd field 401, and each even interpolated line may be generated by performing interpolation on two or more even field lines of the even field 402.

Figure 5:
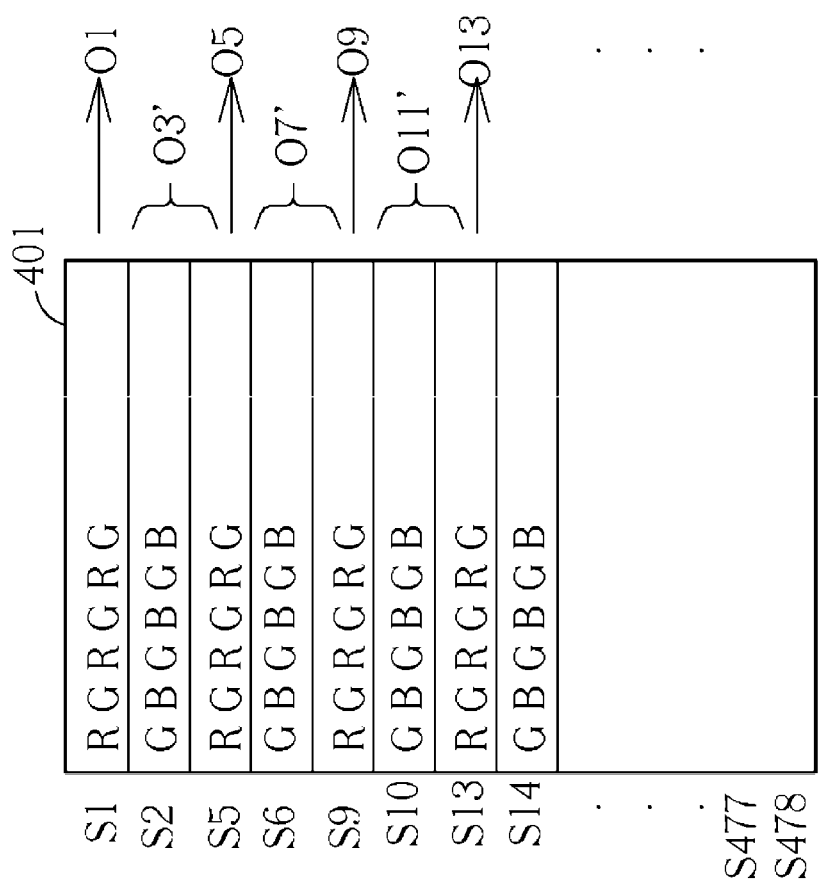
FIG. 5 is a diagram of performing interpolation on an odd field of FIG. 4.
Figure 6:
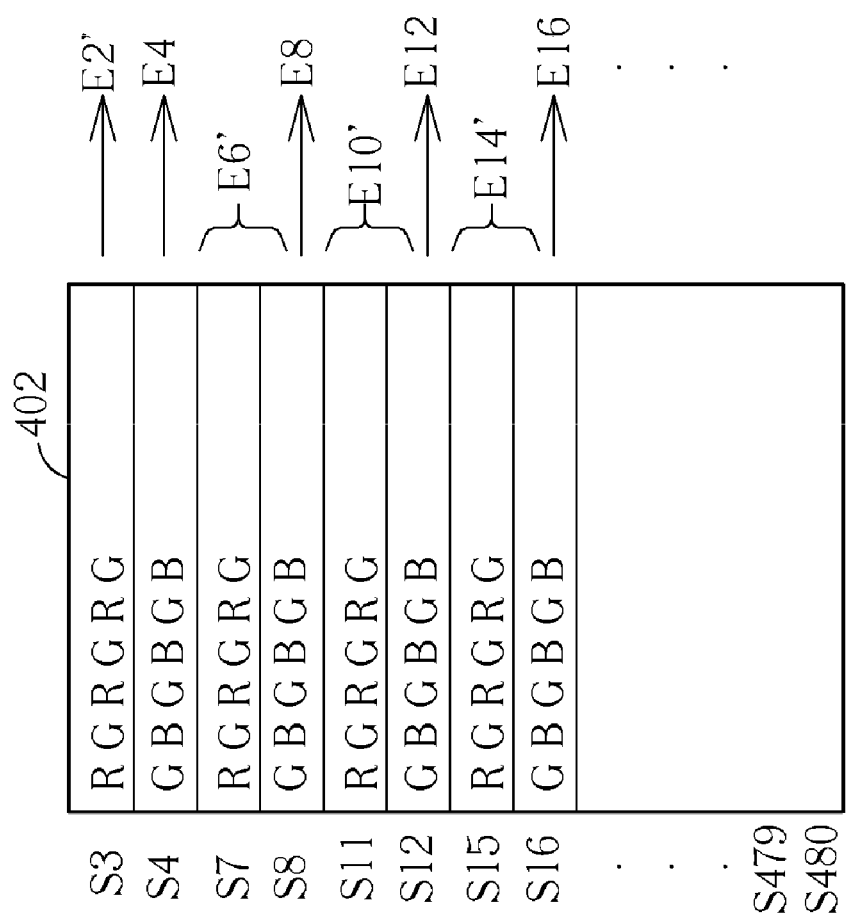
FIG. 6 is a diagram of performing interpolation on an even field of FIG. 4.

Please refer to FIG. 5 and FIG. 6, which illustrate an embodiment of performing interpolation corresponding to the odd field 401 and the even field 402 of FIG. 4, respectively. As shown in FIG. 5, the odd interpolated lines O1, O3', O5, O7', O9, O11', O13, . . . (right hand side of the odd field 401), may be interpolated from the odd field lines generated from the sensor lines S1, S2, S5, S6, S9, S10, S13, S14, . . . (left hand side of the odd field 401). For example, the odd interpolated line O3' may be interpolated from the odd field lines corresponding to the sensor lines S2 and S5. Likewise, the odd interpolated line O5 may be interpolated from the odd field lines corresponding to the sensor lines S5 and S6. In one embodiment, a weighting may be applied when interpolating the odd interpolated line O3' from the odd field lines corresponding to the sensor lines S2 and S5, as the odd field line corresponding to the sensor line S2 is physically closer to the odd interpolated line O3' than the odd field line corresponding to the sensor line S5 is. For example, the odd field line corresponding to the sensor line S2 closer to the odd interpolated line O3' may be assigned a heavier weighting than the odd field line corresponding to the sensor line S5. In another embodiment, the odd interpolated line O3' may be interpolated from the odd field lines corresponding to the sensor lines S1, S2, and S5, with appropriate weightings applied to each of the odd field lines corresponding to the sensor lines S1, S2, and S5 during interpolation. For example, the odd field lines corresponding to the sensor lines S1 and S2 may be assigned a combined weighting equivalent to the odd field line corresponding to the sensor line S5.

Similarly, as shown in FIG. 6, even interpolated lines E2', E4, E6', E8, E10', E12, E14', E16 . . . (right hand side of the even field 402), may be interpolated from the even field lines generated from the sensor lines S3, S4, S7, S8, S11, S12, S15, S16, . . . (left hand side of the even field 402). For example, the even interpolated line E6' may be interpolated from the even field lines corresponding to the sensor lines S4 and S7. Likewise, the even interpolated line 8 may be interpolated from the even field lines corresponding to the sensor lines S7 and S8. In one embodiment, a weighting may be applied when interpolating the even interpolated line E6' from the even field lines corresponding to the sensor lines S4 and S7, as the even field line corresponding to the sensor line S7 is physically closer to the even interpolated line E6' than the even field line corresponding to the sensor line S4 is. For example, the even field line corresponding to the sensor line S7 closer to the even interpolated line E6' may be assigned a weighting heavier than the even field line corresponding to the sensor line S4. In another embodiment, the even interpolated line E6' may be interpolated from the even field lines corresponding to the sensor lines S4, S7, and S8, with appropriate weightings applied to each of the even field lines corresponding to the sensor lines S4, S7, and S8 during interpolation. For example, the even field lines corresponding to the sensor lines S7 and S8 may be assigned a combined weighting equivalent to the even field line corresponding to the sensor line S4.

From the above, it can be seen that a method of generating an interpolated line from an image sensor, such as a CMOS sensor, may also be described. Particularly, a first sensor line may be read out of the image sensor to generate a first field line, such as the odd field line corresponding to a sensor line S2. Then, a second sensor line three sensor lines away from the first sensor line may be read out to generate a second field line, such as the odd field line corresponding to the sensor line S5. Finally, the interpolated line, such as the odd interpolated line O3', may be generated by interpolating between the first field line and the second field line. Of course, this method is easily extended for use with the even field, so no further description is given thereof. As mentioned above, it may be advantageous to assign a first weighting to the first field line to generate a weighted first field line, and a second weighting heavier (or lighter) than the first weighting to the second field line to generate a weighted second field line. Then, interpolation may be performed on the weighted first field line and the weighted second field line to generate the interpolated line. Thus, if the first field line is closer to the interpolated line, the first weighting may be made heavier than the second weighting. Or, if the first field line is further away from the interpolated line, the first weighting may be made lighter than the second weighting.

It can be seen that the embodiment of the present invention provides various advantages. First, no frame buffer is required. Second, the sensor array 400 may employ the traditional color filter, since each pair of adjacent field lines comprises red, blue, and green color information. And, third, the sensor array 400 may operate at a normal speed, as the odd field 401 and the even field 402 are read out from a single frame.

Those skilled in the art will readily observe that numerous modifications and alterations of the device and method may be made while retaining the teachings of the invention.

What is claimed is:

1. A method of generating an interlaced preview from an image sensor, the method comprising:
 reading out a plurality of odd combo lines from a frame to generate an odd field, each odd combo line comprising an odd line and an even line;
 reading out a plurality of even combo lines from the frame to generate an even field, each even combo line comprising an odd line and an even line;
 performing interpolation on a plurality of odd field lines generated from the plurality of odd combo lines to generate a plurality of odd interpolated lines, wherein the number of odd interpolated lines is equal to the number of odd field lines;
 performing interpolation on a plurality of even field lines generated from the plurality of even combo lines to generate a plurality of even interpolated lines, wherein the number of even interpolated lines is equal to the number of even field lines; and
 generating the interlace preview only from the plurality of odd interpolated lines and the plurality of even interpolated lines.

2. The method of claim 1, further comprising:
 assigning a weighting to odd field lines close to the plurality of odd interpolated lines to generate a plurality of weighted odd field lines;
 wherein performing interpolation on the plurality of odd field lines generated from the plurality of odd combo lines to generate the plurality of odd interpolated lines is performing interpolation on the plurality of weighted odd field lines and odd field lines other than the plurality of weighted odd field lines to generate the plurality of odd interpolated lines.

3. The method of claim 2, wherein each odd line and each even line of the frame has a consecutive original sequence number, each of the odd field lines has an odd field sequence number, and each of the odd interpolated lines has an odd interpolated sequence number, and performing interpolation on the plurality of odd field lines includes:
 assigning each odd field line whose odd field sequence number is the same as its original sequence number to a first part of the odd interpolated lines having the same odd interpolated sequence number to generate the first part of the odd interpolated lines; and
 assigning a plurality of weighted combinations of the odd field lines whose odd field sequence numbers are close to the odd interpolated sequence numbers of each of a second part of the odd interpolated lines to generate the second part of the odd interpolated lines.

4. The method of claim 1, further comprising:
 assigning a weighting to even field lines close to the plurality of even interpolated lines to generate a plurality of weighted even field lines;
 wherein performing interpolation on the plurality of even field lines generated from the plurality of even combo lines to generate the plurality of even interpolated lines is performing interpolation on the plurality of weighted even field lines and even field lines other than the plurality of weighted even field lines to generate the plurality of even interpolated lines.

5. The method of claim 1, wherein performing interpolation on the plurality of odd field lines generated from the plurality of odd combo lines to generate the plurality of odd interpolated lines is performing interpolation on adjacent odd field lines to generate the plurality of odd interpolated lines.

6. The method of claim 1, wherein performing interpolation on the plurality of even field lines generated from the plurality of even combo lines to generate the plurality of even interpolated lines is performing interpolation on adjacent even field lines to generate the plurality of even interpolated lines.

7. A method of generating interpolated lines from an image sensor, the method comprising:
 reading out a first sensor line of the image sensor to generate a first line;
 reading out a second sensor line three sensor lines away from the first sensor line to generate a second line;
 generating field lines from the first line and the second line; and
 generating the interpolated lines by interpolating the field lines;
 wherein the number of the interpolated lines is equal to the number of the field lines.

8. The method of claim 7, further comprising:
 assigning a first weighting to the field line generated from the first line to generate a weighted first field line; and assigning a second weighting heavier than the first weighting to the field line generated from the second line to generate a weighted second field line;
wherein generating the interpolated lines by interpolating the field lines is generating the interpolated lines by interpolating between the weighted first field line and the weighted second field line.

9. The method of claim 7, further comprising:
assigning a first weighting to the field line generated from the first line to generate a weighted first field line; and
assigning a second weighting lighter than the first weighting to the field line generated from the second line to generate a weighted second field line;
wherein generating the interpolated lines by interpolating the field lines is generating the interpolated lines by interpolating between the weighted first field line and the weighted second field line.

10. A method of generating an interlaced preview from an image sensor, the method comprising:
reading out a plurality of odd combo lines from a frame to generate an odd field, each odd combo line comprising an odd line and an even line;
reading out a plurality of even combo lines from the frame to generate an even field, each even combo line comprising an odd line and an even line;
assigning a weighting to odd field lines close to the plurality of odd interpolated lines to generate a plurality of weighted odd field lines;
performing interpolation on the plurality of weighted odd field lines and odd field lines other than the plurality of weighted odd field lines to generate the plurality of odd interpolated lines;
performing interpolation on a plurality of even field lines generated from the plurality of even combo lines to generate a plurality of even interpolated lines; and
generating the interlace preview from the plurality of odd interpolated lines and the plurality of even interpolated lines;
wherein each odd line and each even line of the frame has a consecutive original sequence number, each of the odd field lines has an odd field sequence number, and each of the odd interpolated lines has an odd interpolated sequence number, and performing interpolation on the plurality of odd field lines includes:
assigning each odd field line whose odd field sequence number is the same as its original sequence number to a first part of the odd interpolated lines having the same odd interpolated sequence number to generate the first part of the odd interpolated lines; and
assigning a plurality of weighted combinations of the odd field lines whose odd field sequence numbers are close to the odd interpolated sequence numbers of each of a second part of the odd interpolated lines to generate the second part of the odd interpolated lines.

* * * * *